United States Patent
Jin et al.

(10) Patent No.: US 9,465,603 B2
(45) Date of Patent: Oct. 11, 2016

(54) APPLICATION MANAGEMENT APPARATUS, APPLICATION MANAGEMENT SYSTEM, APPLICATION MANAGEMENT METHOD, AND NON-TRANSITORY COMPUTER READABLE MEDIUM

(71) Applicant: FUJI XEROX CO., LTD., Minato-ku, Tokyo (JP)

(72) Inventors: Xiongfan Jin, Kanagawa (JP); Osamu Igarashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/258,599

(22) Filed: Apr. 22, 2014

(65) Prior Publication Data

US 2015/0012913 A1    Jan. 8, 2015

(30) Foreign Application Priority Data

Jul. 8, 2013   (JP) .................................. 2013-143027

(51) Int. Cl.
G06F 9/445    (2006.01)

(52) U.S. Cl.
CPC .. *G06F 8/65* (2013.01); *G06F 8/61* (2013.01)

(58) Field of Classification Search
None
See application file for complete search history.

(56) References Cited

U.S. PATENT DOCUMENTS

| | | | | |
|---|---|---|---|---|
| 6,731,993 B1* | 5/2004 | Carter | ....................... | G06F 3/16 700/94 |
| 2003/0158708 A1* | 8/2003 | Frost | ..................... | H04L 41/024 702/188 |
| 2003/0177223 A1* | 9/2003 | Erickson | .................... | G06F 8/71 709/224 |
| 2004/0093598 A1* | 5/2004 | Haga | ........................ | G06F 8/65 717/173 |
| 2007/0019236 A1* | 1/2007 | Sando | ......................... | 358/1.15 |
| 2008/0040767 A1* | 2/2008 | McCarthy | .......... | H04N 7/17318 725/132 |
| 2008/0288935 A1* | 11/2008 | Kawaguchi | ............... | G06F 8/65 717/172 |
| 2009/0271507 A1* | 10/2009 | Kodimer | ................... | G06F 8/65 709/224 |
| 2012/0044534 A1* | 2/2012 | Ichikawa | ............... | G06F 3/1204 358/1.15 |
| 2012/0092719 A1* | 4/2012 | Jaudon | .................. | G06F 3/1204 358/1.15 |
| 2015/0003806 A1* | 1/2015 | Maeda | .................... | H04N 5/775 386/234 |

FOREIGN PATENT DOCUMENTS

| | | |
|---|---|---|
| JP | 2003-140907 A | 5/2003 |
| JP | 2006-215958 A | 8/2006 |
| JP | 2011-186588 A | 9/2011 |
| JP | 2013-101517 A | 5/2013 |

OTHER PUBLICATIONS

Office Action issued in Japanese Patent Application No. 2013-143027 mailed Jun. 14, 2016.

* cited by examiner

*Primary Examiner* — Isaac T Tecklu
(74) *Attorney, Agent, or Firm* — Sughrue Mion, PLLC

(57) ABSTRACT

An application management apparatus includes an output unit that outputs an application contained in a server to an image processing device connected to the apparatus if the application contained in the server is a first application that is not contained in the image processing device or if the application contained in the server is a second application that is contained in the image processing device but is of a version different from that stored in a storage unit of the image processing device, and that acquires the application from the server and outputs the acquired application to the image processing device if the application contained in the server is not stored in the storage unit of the image processing device.

14 Claims, 8 Drawing Sheets

FIG. 3A

| APPLICATION NAME | APPLICATION VERSION | COMPATIBLE MODEL | COMPATIBLE FIRMWARE VERSION |
|---|---|---|---|
| APPLICATION A | 1.5.0 | MODEL A | 1.0.x.x |
| APPLICATION B | 1.0.8 | MODEL A | 1.x.x.x |
| APPLICATION C | 2.3.0 | MODEL A | 2.x.x.x |
| APPLICATION D | 2.0.2 | MODEL A | 2.0.x.x |
| APPLICATION E | 1.0.0 | MODEL B | 1.0.0.0 |

FIG. 3B

| APPLICATION NAME | APPLICATION VERSION | FIRMWARE VERSION |
|---|---|---|
| APPLICATION A | 1.5.0 | 1.0.9.2 |
| APPLICATION B | 1.0.0 | 1.0.0.0 |
| APPLICATION C | 1.8.3 | 1.5.2.3 |

FIG. 4

| APPLICATION NAME | APPLICATION VERSION | DISPLAY CONTENTS |
|---|---|---|
| APPLICATION A | 1.5.0 | DELETE |
| APPLICATION B | 1.0.8 | UPDATE DELETE |
| APPLICATION C | 2.3.0 | UPDATE |
| APPLICATION D | 2.0.2 | INSTALL |
| APPLICATION E | 1.0.0 | INCOMPATIBLE |

APPLICATION MANAGEMENT APPARATUS, APPLICATION MANAGEMENT SYSTEM, APPLICATION MANAGEMENT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-143027 filed Jul. 8, 2013.

BACKGROUND

Technical Field

The present invention relates to application management apparatuses, application management systems, application management methods, and non-transitory computer readable media.

SUMMARY

According to an aspect of the invention, there is provided an application management apparatus including an output unit that outputs an application contained in a server to an image processing device connected to the apparatus if the application contained in the server is a first application that is not contained in the image processing device or if the application contained in the server is a second application that is contained in the image processing device but is of a version different from that stored in a storage unit of the image processing device, and that acquires the application from the server and outputs the acquired application to the image processing device if the application contained in the server is not stored in the storage unit of the image processing device.

BRIEF DESCRIPTION OF THE DRAWINGS

An exemplary embodiment of the present invention will be described in detail based on the following figures, wherein:

FIG. 3A illustrates an example of a first list according to this exemplary embodiment, and FIG. 3B illustrates an example of a second list according to this exemplary embodiment;

FIG. 4 illustrates an example of display contents displayed on a display according to this exemplary embodiment;

DETAILED DESCRIPTION

Application Management System

An exemplary embodiment of the present invention will be described in detail below with reference to the appended drawings.

Figure 1:
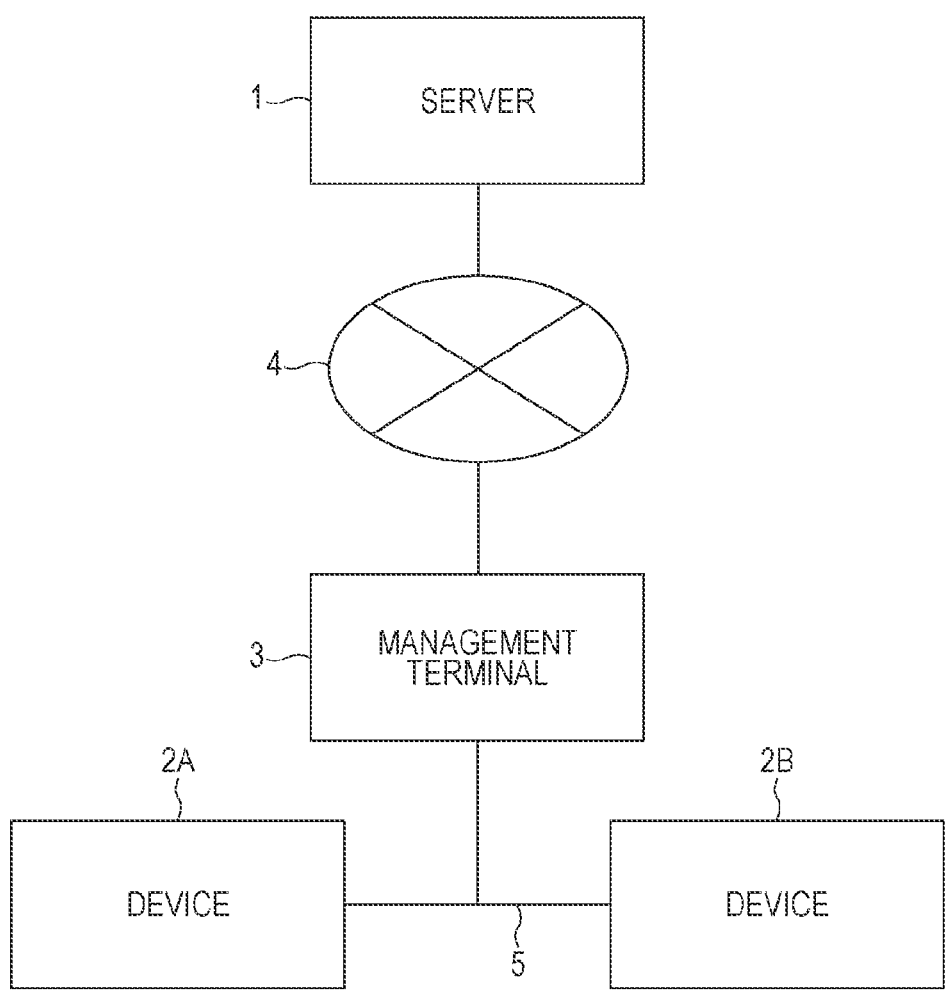
FIG. 1 illustrates an example of a schematic configuration of an application management system according to an exemplary embodiment.

FIG. 1 illustrates an example of a schematic configuration of an application management system according to this exemplary embodiment. In the application management system according to this exemplary embodiment, a server 1 is connected to a management terminal 3, as an example of an application management apparatus, via a network 4. Furthermore, in the application management system according to this exemplary embodiment, the management terminal 3 is connected to multiple image processing devices via a network 5. For simplification, it is assumed that two devices 2 (i.e., a device 2A and a device 2B) are provided as the image processing devices.

The server 1 stores applications to be executed by the devices 2, that is, applications for achieving various functions, such as an image forming function, in the devices 2. In the following description, the term "application" refers to an application to be executed by each device 2. The server 1 also contains a list (sometimes referred to as "first list" hereinafter) of applications contained in the server 1. In addition to applications, for example, the compatible models of application-installable devices 2, the compatible version of firmware for executing each application, and the like are also written in the first list. In this exemplary embodiment, the first list is used as first information. The first list will be described in detail later with reference to FIG. 3A.

Each device 2 is, for example, an image processing device having a function for forming an image onto a recording medium by an electrophotographic method or an inkjet method. As described above, each device 2 executes applications so as to realize various functions, such as an image forming function. Each device 2 contains a list (sometimes referred to as "second list" hereinafter) of applications that have been installed and stored in the device 2. Specifically, the device 2A contains a second list of applications installed in the device 2A, and the device 2B contains a second list of applications installed in the device 2B. In addition to applications, for example, the version of firmware contained in each device 2 for executing each application is also written in the second list. In this exemplary embodiment, the second list is used as second information. The second list will be described in detail later with reference to FIG. 3B.

The management terminal 3, which will be described in detail later, is an apparatus that manages the applications of the devices 2. The management terminal 3 acquires an application from the server 1 via the network 4 and outputs the acquired application to each device 2 via the network 5. The management terminal 3 outputs the application to the device 2 so that a process, such as installation of the application or updating to a new version of the application, is executed in the device 2.

The network 4 as an example of a communication line is a communication unit used for information communication between the server 1 and the management terminal 3 and is, for example, the Internet or a public line. The network 5 is a communication unit used for information communication between the devices 2 and the management terminal 3 and is, for example, a local area network (LAN). In this exemplary embodiment, the server 1 is set in an area different from those of the devices 2, and the server 1 and the devices 2 do not directly communicate with each other but communicate with each other via the management terminal 3.

Functional Configuration of Management Terminal

Figure 2:
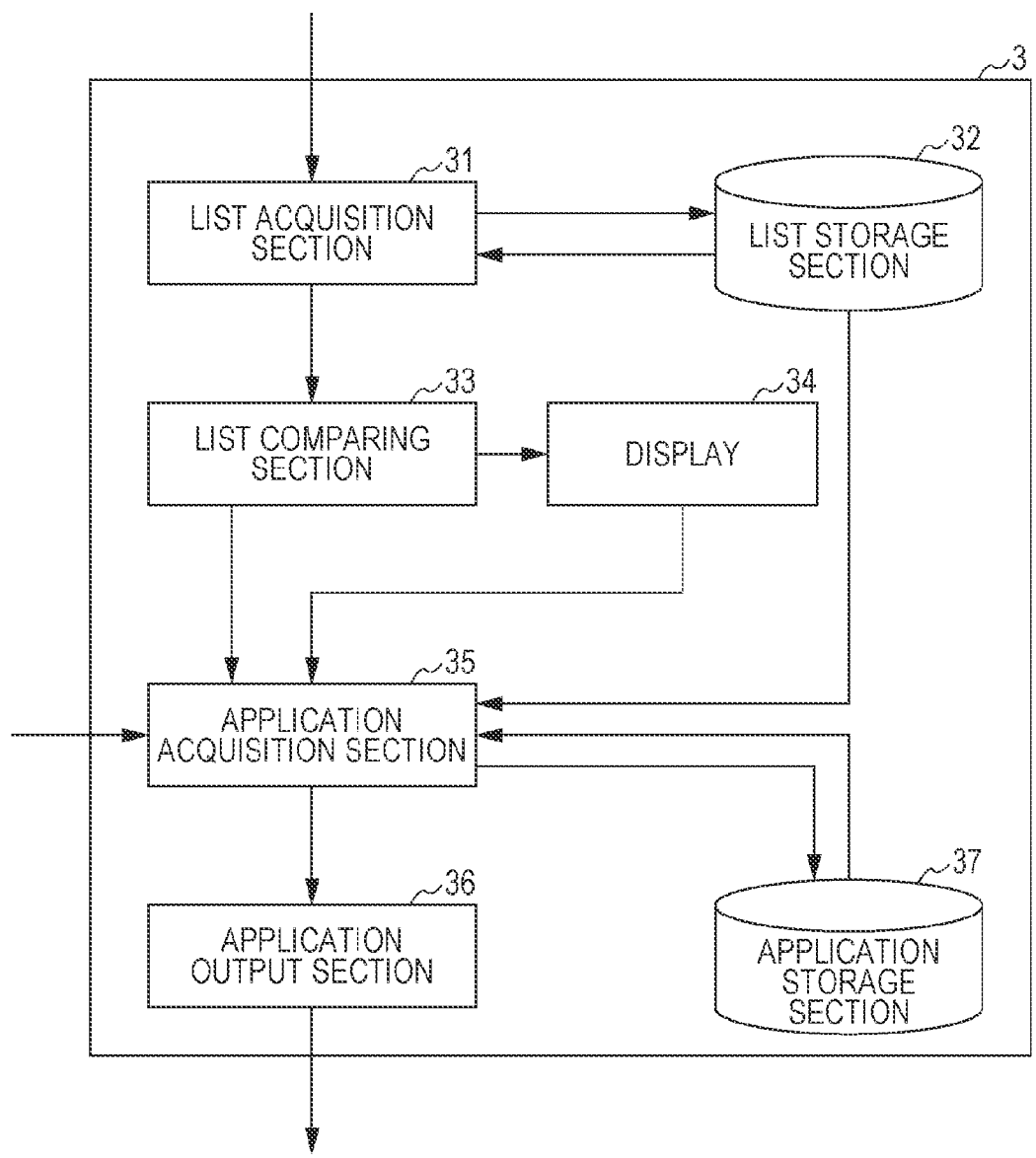
FIG. 2 is a block diagram illustrating an example of a functional configuration of a management terminal according to this exemplary embodiment.

Next, a functional configuration of the management terminal 3 will be described. FIG. 2 is a block diagram illustrating an example of the functional configuration of the management terminal 3 according to this exemplary embodiment.

The management terminal 3 includes a list acquisition section 31 that acquires the first list from the server 1 and the second list from each device 2, a list storage section 32 that stores the first list and the second list, and a list comparing section 33 that compares the first list and the second list.

The management terminal 3 further includes a display 34 that displays the processing contents with respect to the applications contained in the server 1 and receives an operation input performed with respect to the display contents by a user, an application acquisition section 35 that acquires an application from the server 1, an application output section 36 that outputs the application to each device 2, and an application storage section 37 that stores the application acquired from the server 1.

The list acquisition section 31 as an example of an acquisition unit acquires the first list as an example of first information from the server 1 via the network 4 and also acquires the second list as an example of second information from each device 2 via the network 5. For example, when a user commands the management terminal 3 to execute software (sometimes referred to as "management software" hereinafter) for managing the applications of each device 2, the list acquisition section 31 acquires the first list from the server 1. Furthermore, when the user performs an operation input for the management software so as to select a device 2 subject to installation or update of an application, the list acquisition section 31 acquires the second list from the selected device (the term "selected device" may sometimes be used in this context hereinafter). Then, the list acquisition section 31 transmits the acquired first list and the acquired second list to the list storage section 32 and the list comparing section 33.

Moreover, the list acquisition section 31 acquires the first list from the server 1 via the network 4 at a preset time, such as at regular intervals. Then, the list acquisition section 31 transmits the acquired first list to the list storage section 32, acquires the second list of each device 2 from the list storage section 32, and transmits the acquired first list and the acquired second list to the list comparing section 33.

The list storage section 32 as an example of an information storage unit stores the first list and the second list transmitted from the list acquisition section 31. If the first list is already stored in the list storage section 32 when the first list is transmitted from the list acquisition section 31, the list storage section 32 updates the first list. When the second list is transmitted from the list acquisition section 31, if the second list of the same device 2 is already stored in the list storage section 32, the list storage section 32 updates the second list in that device 2. When the management software ends, the list storage section 32 deletes the first list and the second list stored therein.

The list comparing section 33 as an example of a specifying unit compares the first list and the second list transmitted from the list acquisition section 31. In a case where the second list of the selected device selected by user's operation input is transmitted, the list comparing section 33 compares the applications in the first list with the applications written in the second list. Then, of the applications contained in the server 1, the list comparing section 33 specifies an application not contained in the selected device or an application that is contained in the selected device but is of a different version (the application specified here may sometimes be referred to as "specified application" hereinafter).

Specifically, the list comparing section 33 acquires information (sometimes referred to as "first application information" hereinafter) related to the applications in the first list. In this case, the information indicates whether or not each application in the first list is written in the second list or indicates whether or not each application in the first list is of a version different from that in the second list if the application is already written in the second list. Then, the list comparing section 33 transmits the acquired first application information to the display 34. This first application information also includes information indicating, for example, whether or not the selected device is of a compatible model for installation of each application in the first list or whether or not the selected device contains compatible firmware for the application.

In a case where the first list and the second list of each device 2 are transmitted from the list acquisition section 31 at a preset time, the list comparing section 33 compares the applications in the first list with the applications written in the second list of the device 2. Then, of the applications contained in the server 1, the list comparing section 33 specifies an application (sometimes referred to as "new application" hereinafter) that is also stored in the application storage section 37 but is of a version newer than that stored in the application storage section 37. In other words, of the applications written in the first list, the list comparing section 33 specifies an application that is written in any of the second lists but is of a version newer than that of the application in the second list as a new application. Then, the list comparing section 33 transmits, to the application acquisition section 35, information (sometimes referred to as "second application information" hereinafter) including the application name and the version of the specified new application.

The display 34 as an example of a receiving unit displays the processing contents with respect to the applications contained in the server 1 on the basis of the first application information transmitted from the list comparing section 33 and receives an operation input performed with respect to the display contents by the user. Of the applications contained in the server 1, the display 34 performs display for allowing the user to select whether to install, into the selected device, the specified application that is not contained in the selected device, that is, an application that is written in the first list but is not written in the second list.

Furthermore, of the applications contained in the server 1, the display 34 also performs display for allowing the user to select whether to output, to the selected device, the specified application that is contained in the selected device but is of a version newer than that in the selected device, that is, an application in the first list whose version is newer than that written in the second list, and to update the application in the selected device. In addition to the displaying for updating, the display 34 also performs display for allowing the user to select whether to delete the application from the selected device so that the user is also capable of making the selection for deleting the application.

Furthermore, the display 34 performs display for allowing the user to select whether to delete, from the selected device, the application that is contained in the selected device but whose version is newer than or the same as that in the server 1, that is, an application that is written in the second list but whose version is newer than or the same as that written in the first list. If the user decides to delete the application from the selected device, the user may make the selection to delete the application.

Then, when the display 34 receives an operation input performed with respect to the display contents by the user, the display 34 transmits the received input contents to the application acquisition section 35. The display contents of the display 34 described above will be described in detail later with reference to FIG. 4.

The application acquisition section 35 as an example of a determining unit and an output unit acquires an application from the server 1 or the application storage section 37 on the basis of the user's input contents transmitted from the display 34 and the second application information transmitted from the list comparing section 33 at a preset time. If the display 34 receives an operation input for executing an installation process or an update process for installing the specified application into the selected device, the application acquisition section 35 acquires the second list of each device 2 from the list storage section 32. Then, based on the second list, the application acquisition section 35 determines whether or not the specified application is already stored in the application storage section 37 as an application to be executed by another device 2.

Then, if the application acquisition section 35 determines that the specified application is already stored in the application storage section 37, the application acquisition section 35 acquires the specified application from the application storage section 37 and transmits the acquired specified application to the application output section 36. On the other hand, if the application acquisition section 35 determines that the specified application is not stored in the application storage section 37, the application acquisition section 35 acquires the specified application from the server 1, makes the application storage section 37 store the acquired specified application, and transmits the acquired specified application to the application output section 36.

Furthermore, when the display 34 receives an operation input for deleting an application from the selected device, the application acquisition section 35 transmits a notification for deleting the application to the application output section 36.

Moreover, when the second application information is transmitted from the list comparing section 33 at the preset time, the application acquisition section 35 acquires a new application from the server 1 on the basis of the second application information. Then, the application acquisition section 35 makes the application storage section 37 store the acquired new application so as to update the already-stored application.

The application output section 36 as an example of an output unit outputs the specified application transmitted from the application acquisition section 35 to the selected device for an installation process for adding the specified application to the selected device or a version update process for replacing the application contained in the selected device with the specified application. Moreover, the application output section 36 outputs, to the selected device, a notification for deleting the application transmitted from the application acquisition section 35.

The application storage section 37 as an example of a storage unit stores the application transmitted from the application acquisition section 35. Furthermore, when the management software ends, the application storage section 37 deletes the application stored therein.

Application Lists

Next, the first and second lists in which applications are written will be described. FIG. 3A illustrates an example of the first list according to this exemplary embodiment. Applications A to E are written in the first list shown in FIG. 3A, and these applications A to E are contained in the server 1. For each application, the version of the application, the compatible model of application-installable device 2, and the version of compatible application-executable firmware are written. In this exemplary embodiment, firmware is used as an example of software that corresponds to each application.

In detail, the versions of applications A to E are 1.5.0, 1.0.8, 2.3.0, 2.0.2, and 1.0.0, respectively. With regard to the models compatible with applications A to E, applications A to D correspond to model A, and application E corresponds to model B. The versions of firmware compatible with applications A to E are 1.0.x.x, 1.x.x.x, 2.x.x.x, 2.0.x.x, and 1.0.0.0, respectively. The character "x" used for indicating each version of the firmware may express any number ranging between 0 and 9. For example, version "1.0.x.x" includes firmware of version 1.0.0.0 as well as firmware of version 1.0.9.9.

FIG. 3B illustrates an example of the second list according to this exemplary embodiment. Applications A to C are written in the second list shown in FIG. 3B, and the selected device containing this second list contains applications A to C. For each application, the version of the application and the version of the firmware contained in the device 2 for executing the application are written. In detail, the versions of applications A to C are 1.5.0, 1.0.0, and 1.8.3, respectively. The versions of firmware corresponding to applications A to C and contained in the device 2 are 1.0.9.2, 1.0.0.0, and 1.5.2.3, respectively.

Display Contents on Display

Next, the display contents on the display 34 will be described. FIG. 4 illustrates an example of the display contents displayed on the display 34. The display contents shown in FIG. 4 are an example of contents displayed on the basis of the first application information obtained at the list comparing section 33 by comparing the first list shown in FIG. 3A and the second list shown in FIG. 3B.

With regard to application A, the version thereof in the server 1 and the version thereof in the selected device are the same, which is 1.5.0 (see FIGS. 3A and 3B). In this case, the display 34 displays a delete button. When the user selects the delete button, application A in the selected device is deleted therefrom.

With regard to application B, the version thereof in the server 1 and the version thereof in the selected device are 1.0.8 and 1.0.0, respectively (see FIGS. 3A and 3B), meaning that the version in the server 1 is the newer. Therefore, the display 34 displays an update button. When the user selects the update button, application B in the selected device is updated to application B of version 1.0.8 contained in the server 1. As shown in FIG. 4, the display 34 also displays a delete button for deleting application B.

With regard to application C, the version thereof in the server 1 and the version thereof in the selected device are 2.3.0 and 1.8.3, respectively (see FIGS. 3A and 3B), meaning that the version in the server 1 is the newer. Therefore, the display 34 displays an update button. However, the version of firmware compatible with application C is 2.x.x.x, whereas the version of firmware in the selected device is 1.5.2.3 (see FIGS. 3A and 3B). In other words, since the selected device is not capable of executing application C of version 2.3.0 by using the contained firmware, firmware update is executed. Therefore, the display 34 performs display for prompting the user that the firmware should be updated, such as displaying an update button as well as displaying a message notifying that firmware update should be performed as a pre-process for updating application C.

Applications D and E are not contained in the selected device, and the compatible models are models A and B, respectively (see FIGS. 3A and 3B). For example, assuming that the model of the selected device is model A, although application D is installable therein, application E is not installable therein. In this case, an install button is displayed for application D. When the install button is selected by the user, application D is installed into the selected device. In this case, if the firmware corresponding to the application is not contained in the selected device or the firmware should be updated, the display 34 performs display for prompting the user that the firmware should be installed or updated, similarly to the process performed for application C.

On the other hand, since application E is not installable into the selected device, the display 34 displays a message indicating that application E is not compatible with the selected device.

Procedure of Installation-Update Process

Figure 5A:
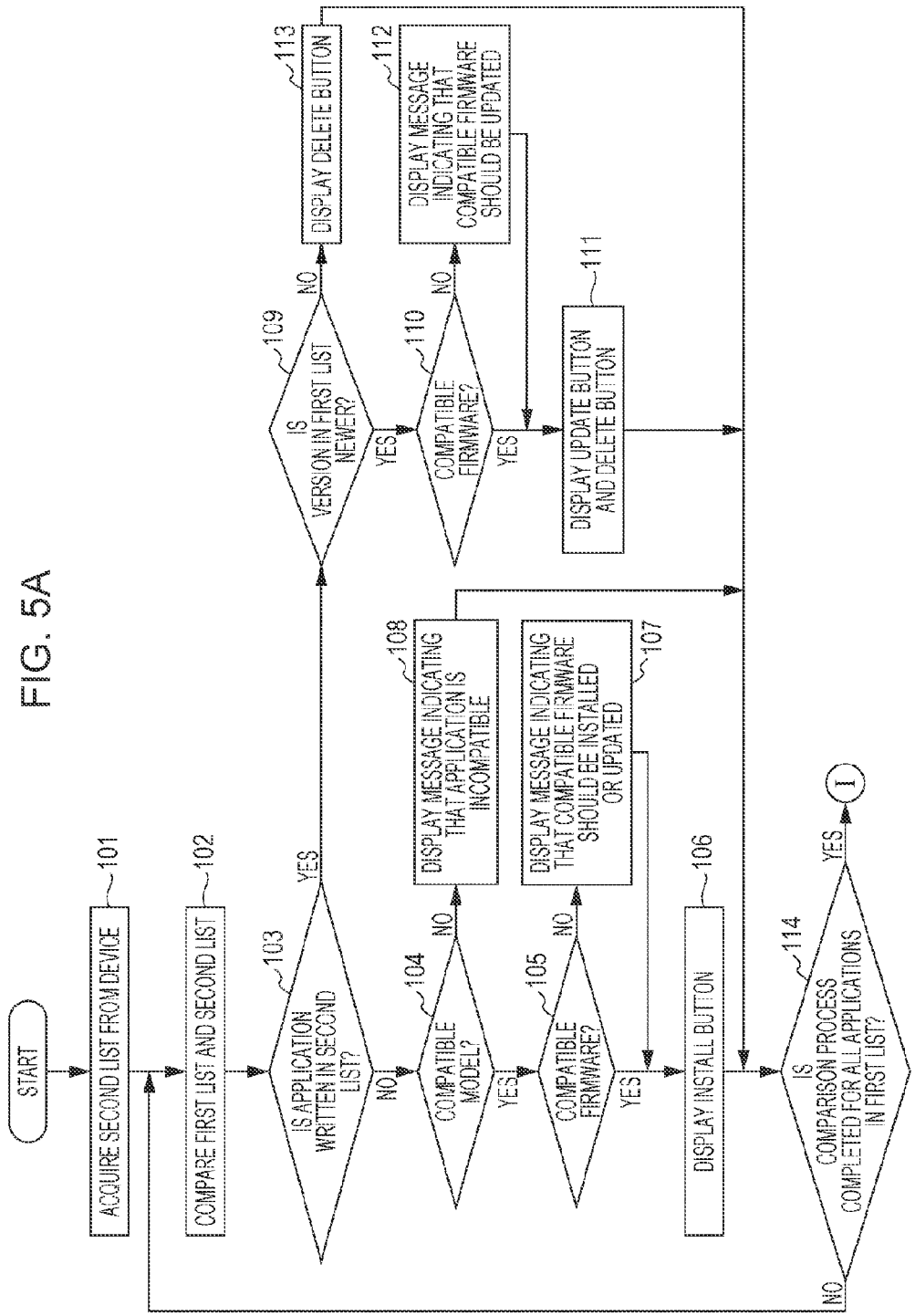
FIGS. 5A and 5B illustrate a flowchart showing an example of a procedure of processing performed on a device by the management terminal, in accordance with this exemplary embodiment.
Figure 5B:
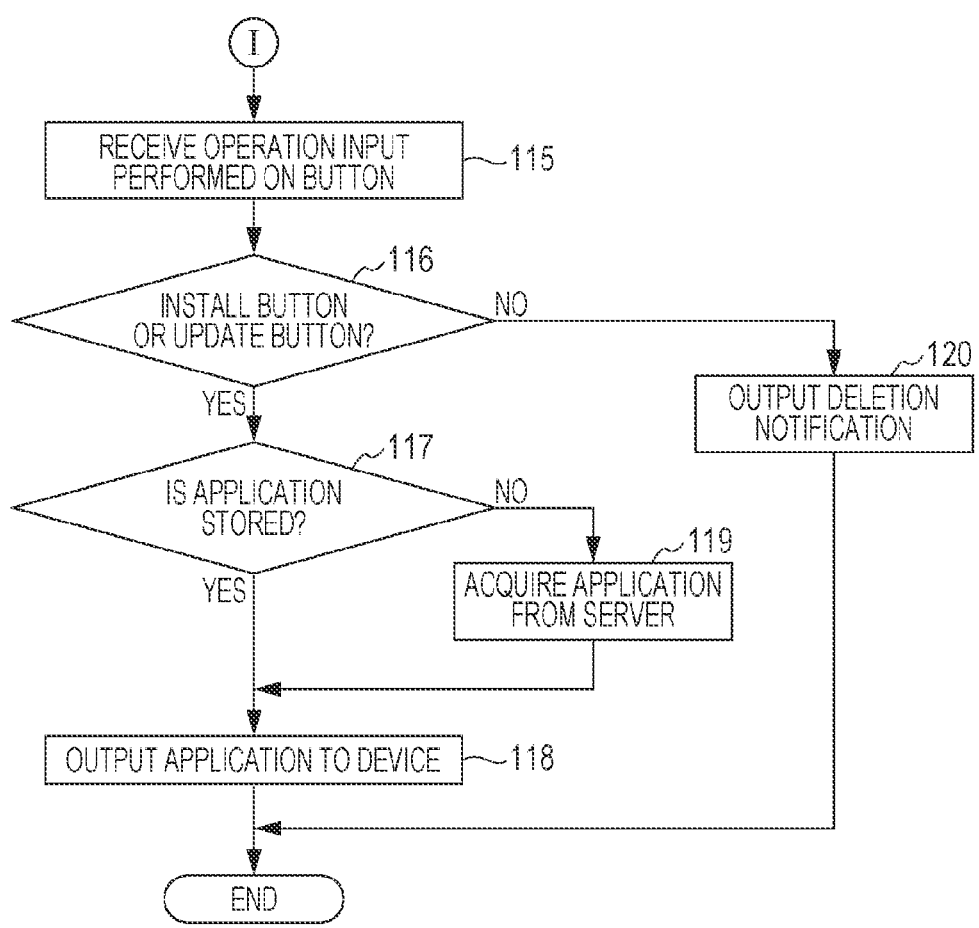

Next, the operation of the management terminal 3 when installing an application into or updating an application in a device 2 will be described. FIGS. 5A and 5B illustrate a flowchart showing an example of a procedure of processing performed on a device 2 by the management terminal 3, in accordance with this exemplary embodiment. In the initial state, it is assumed that the user has activated the management software. With the activation of the management software, the list acquisition section 31 acquires the first list from the server 1 and transmits the first list to the list storage section 32 and the list comparing section 33.

In step 101, when the user performs an operation input to select a device 2, the list acquisition section 31 acquires the second list from the selected device and transmits the second list to the list storage section 32 and the list comparing section 33. In step 102, the list comparing section 33 compares the first list and the second list transmitted from the list acquisition section 31. In this case, the list comparing section 33 selects one of applications written in the first list and compares the application with an application written in the second list. Then, the list comparing section 33 acquires first application information related to the selected application in the first list and transmits the acquired first application information to the display 34.

In step 103, in the acquisition process of the first application information, the list comparing section 33 first determines whether or not the application written in the first list is written in the second list. If the application is not written in the second list (NO in step 103), the list comparing section 33 determines in step 104 whether or not the selected device is of a model compatible with the application. If the selected device is of a model compatible with the application (YES in step 104), the list comparing section 33 determines in step 105 whether or not the selected device contains compatible firmware that corresponds to the application. If the selected device contains the firmware corresponding to the application (YES in step 105), the display 34 displays an install button for the application in the first list in step 106 on the basis of the first application information transmitted from the list comparing section 33. After step 106, the processing proceeds to step 114, which will be described later.

On the other hand, if the selected device does not contain the compatible firmware and the firmware should be installed or updated (NO in step 105), the compatible firmware should be installed or updated prior to installing the application. Thus, in step 107, the display 34 performs display for prompting the user that the firmware should be installed or updated on the basis of the first application information transmitted from the list comparing section 33. If the selected device is not of a model compatible with the application (NO in step 104), the display 34 displays that the application in the first list is incompatible in step 108 on the basis of the first application information transmitted from the list comparing section 33. After step 108, the processing proceeds to step 114, which will be described later.

If a positive result (YES) is obtained in step 103, that is, if the application is written in both the first list and the second list, the list comparing section 33 determines in step 109 whether or not the application in the first list is of a newer version. If the application in the first list is of a newer version (YES in step 109), the list comparing section 33 subsequently determines in step 110 whether or not the selected device contains compatible firmware that corresponds to the application. If the selected device contains the compatible firmware (YES in step 110), the display 34 displays an update button and a delete button for the application in the first list in step 111 on the basis of the first application information transmitted from the list comparing section 33. After step 111, the processing proceeds to step 114, which will be described later.

If the selected device does not contain the compatible firmware and the firmware should be updated (NO in step 110), the compatible firmware should be updated prior to installing the application. Thus, in step 112, the display 34 performs display for prompting the user that the firmware should be updated on the basis of the first application information transmitted from the list comparing section 33. If a negative result (NO) is obtained in step 109, that is, if the application in the second list is of a newer version or the same version, the display 34 displays a delete button for the application in the first list in step 113 on the basis of the first application information transmitted from the list comparing section 33. After step 113, the processing proceeds to step 114, which will be described later.

Then, when the list comparing section 33 completes the comparison process for all applications in the first list (YES in step 114), the display 34 performs display for all of the applications in the first list and receives an operation input performed on each button by the user in step 115. On the other hand, if there is any application in the first list that has not undergone the comparison process yet (NO in step 114), the processing proceeds to step 102.

Subsequently, when the display 34 receives an operation input performed on the install button or the update button by the user (YES in step 116), the application acquisition section 35 determines in step 117 whether or not the specified application is already stored in the application storage section 37 as an application to be executed by another device 2. If the application acquisition section 35 determines that the specified application is stored in the application storage section 37 (YES in step 117), the application acquisition section 35 acquires the specified application from the application storage section 37 and transmits the acquired specified application to the application output section 36. Then, in step 118, the application output section 36 outputs the transmitted specified application to the selected device, and the processing ends.

On the other hand, if the application acquisition section 35 determines that the specified application is not stored in the application storage section 37 (NO in step 117), the application acquisition section 35 acquires the specified application from the server 1 in step 119. Then, the application acquisition section 35 makes the application storage section 37 store the acquired specified application and transmits the acquired specified application to the application output section 36. The processing then proceeds to step 118 where the application output section 36 outputs the specified application to the selected device, and the processing ends. By transmitting the specified application to the selected device, the application is installed or updated in the selected device.

For example, in step 115 to step 119 described above, the specified application acquired from the server 1 by the application acquisition section 35 after the selection of the install button by the user and subsequently output to the selected device will be referred to as "specified application A". After the application output section 36 completes the process in step 118 for outputting specified application A to the selected device, it is assumed that the user performs an operation input with respect to the management software so as to select another selected device. In this case, the processing in the flowchart described above is commenced again, so that step 101 to step 114 are executed again. In other words, the first list in the server 1 and the second list in another selected device are compared, and the display 34 displays, for example, the install button or the update button for all applications in the first list.

Subsequently, for example, when the user selects the install button for specified application A, the application acquisition section 35 determines whether or not specified application A is stored in the application storage section 37. In this case, specified application A is already stored in the application storage section 37 and is to be output to the selected device. Therefore, without acquiring specified application A from the server 1, the application acquisition section 35 transmits specified application A stored in the application storage section 37 to the application output section 36. Then, the application output section 36 outputs specified application A to another selected device.

Referring back to the flowchart, when the display 34 receives an operation input of the delete button instead of the install button or the update button (NO in step 116), the application acquisition section 35 transmits an application deletion notification to the application output section 36. Then, in step 120, the application output section 36 outputs the application deletion notification to the selected device, and the processing ends. When the selected device receives the deletion notification, the selected device deletes the application corresponding to the notification.

Furthermore, when an application is, for example, installed into, updated in, or deleted from the selected device, the selected device updates the second list on the basis of the executed processing contents. Then, the selected device transmits the updated second list to the management terminal 3, and the updated second list is stored into the list storage section 32 of the management terminal 3. Therefore, when the same device 2 is subsequently selected by the user, the list acquisition section 31 may acquire the second list from the list storage section 32 in step 101 without acquiring the second list from that device 2.

Accordingly, when the user selects a device 2 using the management software in the management terminal 3, an application is, for example, installed into or updated in the selected device 2. If the application to be used for installation or update is contained in the management terminal 3, the management terminal 3 outputs the application directly to the device 2 without acquiring the application from the server 1. In other words, with regard to an application once acquired from the server 1, the management terminal 3 outputs the application to the device 2 without reacquiring the application from the server 1, and the application is installed into or updated in the device 2, whereby a load on the server 1 as well as a load on the network 4 between the server 1 and the management terminal 3 may be reduced.

Application Update Process

Figure 6:
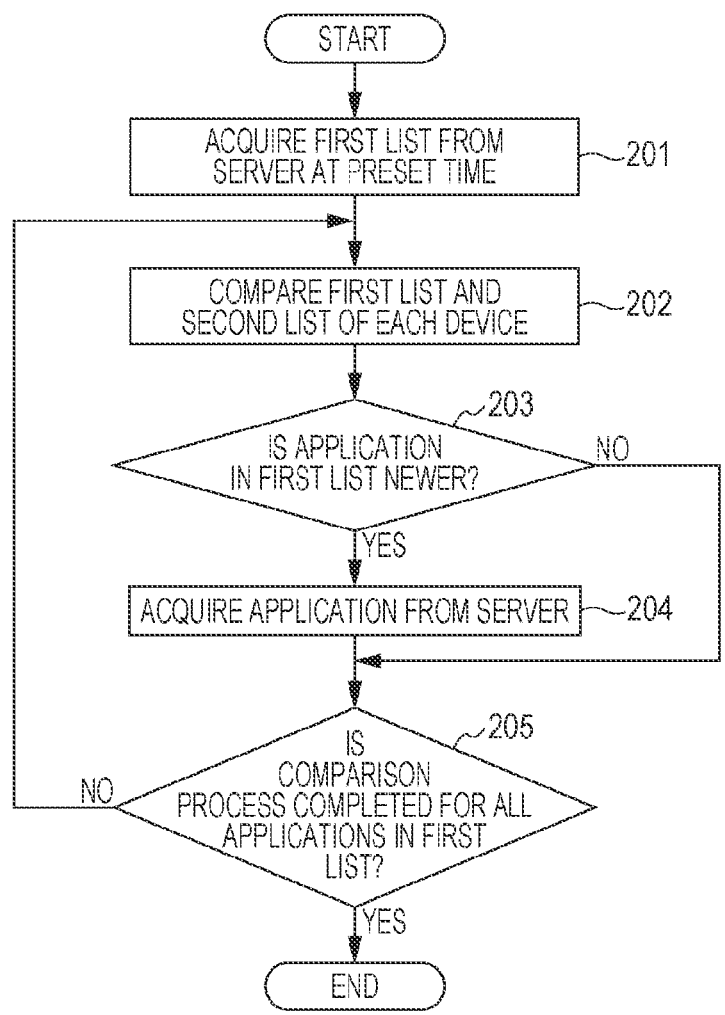
FIG. 6 is a flowchart illustrating an example of a procedure for updating an application contained in the management terminal according to this exemplary embodiment.

Next, the operation of the management terminal 3 when updating an application contained in the management terminal 3 will be described. FIG. 6 is a flowchart illustrating an example of a procedure for updating an application contained in the management terminal 3 according to this exemplary embodiment. This operation is performed by the management terminal 3 at a preset time, such as at regular intervals.

In step 201, the list acquisition section 31 acquires the first list from the server 1. Then, the list acquisition section 31 transmits the acquired first list to the list storage section 32. Furthermore, the list acquisition section 31 acquires the second list of each of the devices 2 from the list storage section 32, and transmits the acquired first list and the acquired second list to the list comparing section 33. In step 202, the list comparing section 33 compares the first list and the second list of each device 2 transmitted from the list acquisition section 31. In step 203, the list comparing section 33 selects one of the applications written in the first list, compares the selected application with the corresponding application written in the second list, and determines whether or not the version of the selected application is newer than that of the application written in the second list.

If it is determined that the application in the first list is of a newer version (YES in step 203), the list comparing section 33 transmits second application information related to the new application, which is the selected application in the first list, to the application acquisition section 35. Then, in step 204, the application acquisition section 35 acquires the new application from the server 1 on the basis of the second application information and performs an application update process by making the application storage section 37 store the acquired new application. On the other hand, if it is determined that the application in the first list is of an older version or the same version (NO in step 203), the application acquisition section 35 does not acquire the application from the server 1.

Then, when the list comparing section 33 completes the comparison process for all applications in the first list (YES in step 205), the processing ends. On the other hand, if there is any application in the first list that has not undergone the comparison process yet (NO in step 205), the processing proceeds to step 202.

Accordingly, the management terminal 3 acquires the first list from the server 1 at a preset time, compares the first list with the second list of each device 2, and updates the application stored in the application storage section 37. Therefore, the management terminal 3 is capable of containing the newest version of the application contained in the server 1. For example, when an application is to be installed into or updated in a selected device, as in the example shown in FIG. 5, the management terminal 3 outputs the newest version of the application to the device 2.

Although the processing ends when the application stored in the application storage section 37 is updated in the example shown in FIG. 6, the configuration is not limited thereto. For example, the second application information obtained as a result of the comparison process performed by the list comparing section 33 may be transmitted to the display 34, and the display 34 may be configured to display the processing contents with respect to each application in the first list. With this configuration, the user may perform an operation input with respect to the display contents on the display 34 so that, for example, an application installation or update process may be executed in the device 2. Furthermore, for example, the management terminal 3 may automatically output the acquired new application to the device 2 regardless of an operation input performed by the user. With this configuration, the management terminal 3 automatically updates the application contained in the device 2 to the newest version without user's operation.

Furthermore, in this exemplary embodiment, when the management software ends, the application storage section 37 deletes the application stored therein, and the list storage section 32 deletes the first list and the second list stored therein. However, the configuration is not limited thereto. For example, when all devices 2 managed by the management software are selected by the user and, for example, the application installation or update process is completed, the application storage section 37 may determine that the stored application will not be used again and thus delete the application. With this configuration, a data storage area provided in the management terminal 3 may be utilized efficiently.

Furthermore, in this exemplary embodiment, the list comparing section 33 determines whether or not the selected device is of a compatible model for installation of each application in the first list, and the display 34 displays a message indicating that the application is not compatible with the selected device. However, the configuration is not limited thereto. For example, the display 34 may be configured not to display the incompatible application on the screen, via which the user selects the processing contents, so as not to allow the user to select a process corresponding to that application.

Furthermore, for example, the list comparing section 33 may be configured not to determine whether or not the selected device is of a compatible model for installation of each application. In this case, the display 34 displays an install button for a selected device that is not of a compatible model for installation of the application. When the install button is selected and the installation process is actually executed, if the installation is unsuccessful, for example, a message indicating that the selected device is not of a compatible model for installation is displayed.

Furthermore, in this exemplary embodiment, a message notifying that a firmware installation or update process should be performed as a pre-process for installing or updating an application is displayed. However, the configuration is not limited thereto. For example, a button to be used for executing a firmware installation or update process may be displayed, and the firmware installation or update process may be executed when the button is selected by the user. Moreover, for example, when the user selects the install button or the update button for an application, a firmware installation or update process corresponding to the application may be executed simultaneously.

Hardware Configuration

Figure 7:
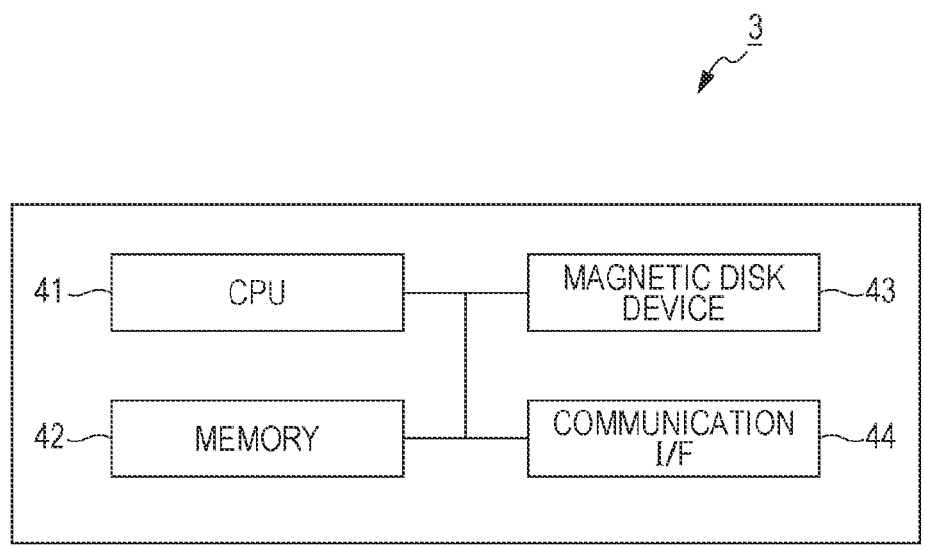
FIG. 7 illustrates an example of a hardware configuration of the management terminal according to this exemplary embodiment.

Next, a hardware configuration in the management terminal 3 will be described. FIG. 7 illustrates an example of the hardware configuration of the management terminal 3 according to this exemplary embodiment.

As shown in FIG. 7, the management terminal 3 includes a central processing unit (CPU) 41 that performs an arithmetic process, and a memory 42 and a magnetic disk device (hard disk drive (HDD)) 43 that serve as storage areas. The CPU 41 executes various kinds of software, such as an operating system (OS). The memory 42 stores, for example, various kinds of software and data used for executing the various kinds of software. The magnetic disk device 43 stores a program for realizing the functions of the management terminal 3 shown in FIG. 2. This program is loaded into the memory 42, and the CPU 41 executes a process based on this program so as to realize the functions. Furthermore, the management terminal 3 includes a communication interface (I/F) 44 used for communicating with the outside.

In detail, in the management terminal 3, for example, the acquisition of the first and second lists, the comparison between the first and second lists, and the acquisition of applications are performed in accordance with a command of the CPU 41. Furthermore, the application output section 36 is realized by, for example, the communication I/F 44. Moreover, the list storage section 32 and the application storage section 37 are realized by, for example, the magnetic disk device 43.

Program

The process performed by the management terminal 3 according to this exemplary embodiment described above is prepared as, for example, a program such as application software.

Therefore, the process performed by the management terminal 3 may be considered as a program for causing a computer to realize first to fourth functions with respect to an application to be executed by an image processing device connected to the management terminal 3. The first function involves acquiring, from a server connected to the management terminal 3 via a communication line, first information related to the application contained in the server and acquiring, from the image processing device, second information related to the application contained in the image processing device. The second function involves specifying whether the application contained in the server is not contained in the image processing device or whether the application contained in the server is contained in the image processing device but is of a version different from that in the image processing device on the basis of the acquired first information and the acquired second information. The third function involves determining whether or not the specified application is already stored in a storage unit as an application to be executed by another image processing device connected to the management terminal 3. The fourth function involves outputting the specified application to the image processing device if the specified application is determined as being stored in the storage unit, or acquiring the specified application from the server if the specified application is determined as being not stored in the storage unit, making the storage unit store the acquired specified application, and outputting the acquired specified application to the image processing device.

The program that realizes the exemplary embodiment of the present invention may be provided via the communication unit or may be provided by being stored in a recording medium, such as a compact disc read-only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An application management apparatus comprising:
at least one processor executing:
an output unit configured to output an application to an image processing device connected to the application management apparatus in response to the at least one processor determining that an application stored in a server is a first application that is not stored in the image processing device or in response to the at least one processor determining that the application stored in the server is a second application that is stored in the image processing device but is of a version different from the application stored in a storage unit of the image processing device;
an acquisition unit configured to acquire at a preset time, from the server connected to the application management apparatus via a communication line, first information related to the application stored in the server and acquire, from the image processing device, second information related to an application stored in the image processing device; and
a display configured to display information indicating that the application stored in the server is incompatible, if the application stored in the server is incompatible with the application stored in the image processing apparatus,
wherein if the application stored in the server is not stored in the application management apparatus, the output unit is further configured to acquire the application stored in the server and output the acquired application to the image processing device,
wherein if the application stored in the server also is stored in the application management apparatus, the output unit is further configured to output the application stored in the application server to the image processing unit without acquiring the application stored in the server,
wherein the at least one processor is configured to specify that the application stored in the server is a new application if the application stored in the server is a newer version than the application stored in the storage unit of the image processing device based on the first information and one piece or a plurality of pieces of the second information stored in the information storage unit,
wherein the first information comprises a first application name, a first application version, a compatible model of an application-installable device, and a version of compatible application-executable firmware, and
wherein the second information comprises a second application name, a second application version and a version of a firmware contained in the image processing device.

2. The application management apparatus according to claim 1, further comprising:
an information storage unit configured to store the second information acquired by the acquisition unit from the image processing device or a plurality of the image processing devices including the image processing device,
wherein the acquisition unit is further configured to acquire the first information from the server at a preset time.

3. The application management apparatus according to claim 1, further comprising a receiving unit configured to receive, from a user, a command to output the application stored in the server to the image processing device.

4. The application management apparatus according to claim 3, wherein when the receiving unit receives the command to output the application contained in the server to the image processing device and software corresponding to the acquired application is not stored in the image processing device, the receiving unit is further configured to display information prompting the user to load the software into the image processing device prior to the outputting of the acquired application to the image processing unit.

5. The application management apparatus according to claim 1, wherein the application that is output from the output unit is an application selected by a user.

6. The application management apparatus according to claim 1, wherein the output unit is further configured to cause the storage unit to store the first application or the second application.

7. An application management system comprising:
a plurality of image processing devices each configured to form an image onto a recording medium by executing an application;
a server configured to store the application; and
an application management apparatus that is connected to the plurality of image processing devices, is connected to the server via a communication line, and is configured to manage the application stored in each image processing device,
wherein the application management apparatus includes:
at least one processor executing:
an output unit configured to output the application to at least one of the image processing devices connected to the apparatus in response to the at least one processor determining that the application stored in the server is not stored in the image processing device or in response to the at least one processor determining that the application stored in the server is stored in the image processing device but is of a version different from the application stored in a storage unit of the image processing device;
an acquisition unit configured to acquire at a preset time, from the server connected to the application management apparatus via a communication line, first information related to the application stored in the server and acquire, from the image processing device, second information related to the application stored in the image processing device; and
a display configured to display information indicating that the application stored in the server is incompatible, if the application stored in the server is incompatible with the image processing apparatus,
wherein if the application stored in the server is not stored in the application management apparatus, the output unit is further configured to acquire the application from the server and output the acquired application to the image processing device, and
wherein if the application stored in the server also is stored in the application management apparatus, the output unit is further configured to output the stored application to the image processing unit without acquiring the application from the server,
wherein the at least one processor is configured to specify that the application stored in the server is a new application if the application stored in the server is a newer version than the application stored in the storage unit of the image processing device based on the first information and one piece or a plurality of pieces of the second information stored in the information storage unit, wherein the first information comprises a first application name, a first application version, a compatible model of an application-installable device, and a version of compatible application-executable firmware, and wherein the second information comprises a second application name, a second application version and a version of a firmware contained in the image processing device.

8. A non-transitory computer readable medium storing a program causing a computer to execute a process for managing an application to be executed by an image processing device connected to an apparatus, the process comprising:

outputting the application to the image processing device connected to the apparatus in response to determining that an application stored in the server is a first application that is not stored in the image processing device or in response to determining that an application stored in the server is a second application that is stored in the image processing device but is of a version different from that stored in a storage unit of the image processing device;

acquiring at preset time, from the server connected to the application management apparatus via a communication line, first information related to the application stored in the server and acquiring, from the image processing device, second information related to an application stored in the image processing device;

specifying that the application stored in the server is a new application if the application stored in the server is the second application but is of a newer version than the application stored in the storage unit of the image processing device based on the first information and one piece or a plurality of pieces of the second information stored in the information storage unit; and displaying information indicating that the application stored in the server is incompatible, if the application is incompatible with the image processing apparatus, wherein if the application is not stored in the apparatus, acquiring the application from the server and outputting the acquired application to the image processing device, wherein if the application is stored in the apparatus, outputting the application stored in the apparatus to the image processing unit without acquiring the application from the server, wherein the first information comprises a first application name, a first application version, a compatible model of an application-installable device, and a version of compatible application-executable firmware, and wherein the second information comprises a second application name, a second application version and a version of a firmware contained in the image processing device.

9. An application management method for managing an application to be executed by an image processing device connected to an apparatus, the method comprising:

outputting the application to the image processing device connected to the apparatus in response to determining that an application stored in a server is a first application that is not stored in the image processing device or in response to determining that the application stored in the server is a second application that is stored in the image processing device but is of a version different from the application stored in a storage unit of the image processing device;

acquiring at preset time, from the server connected to the application management apparatus via a communication line, first information related to the application stored in the server and acquiring, from the image processing device, second information related to an application stored in the image processing device;

specifying that the application stored in the server is a new application if the application stored in the server is the second application but is of a newer version than the application stored in the storage unit of the image processing device based on the first information and one piece or a plurality of pieces of the second information stored in the information storage unit; and displaying information indicating that the application stored in the server is incompatible, if the application is incompatible with the image processing apparatus, wherein if the application stored in a server is not stored in the apparatus, acquiring the application from the server and outputting the acquired application to the image processing device, wherein if the application stored in the server is stored in the apparatus, outputting the stored application to the image processing unit without acquiring the application from the server, wherein the first information comprises a first application name, a first application version, a compatible model of an application-installable device, and a version of compatible application-executable firmware, and wherein the second information comprises a second application name, a second application version and a version of a firmware contained in the image processing device.

10. A management apparatus comprising:

a processor executing:

a storage unit configured to store an application to be executed by an image processing device connected to the management apparatus;

an acquisition unit configured to acquire at a preset time, from a server connected to the management apparatus via a communication line, first information related to an application stored in the server and acquire, from the image processing device, second information related to the application stored in the image processing device; and a display unit configured to display, to a user, information indicating that the application stored in the server is a first application that is not stored in the image processing device or information indicating that the application stored in the server is a second application that is stored in the image processing device but is of a different version from the application stored in the image processing device, on the basis of the first information and the second information acquired by the acquisition unit, wherein the display unit is further configured to display information prompting the user to input a command to output the application stored in the server to the image processing device, in response to the application stored in the server being the first application or the second application, wherein if the application stored in the server is not stored in the storage unit, the management apparatus is configured to acquire the application from the server and output the acquired application to the image processing device, wherein if the application stored in the server is stored in the storage unit, the management apparatus is further configured to output the stored application to the image processing unit without acquiring the application from the server, and wherein if the application stored in the server is incompatible with the image processing device, the display unit is configured to display information indicating that the application stored in the server is incompatible, wherein the first information comprises a first application name, a first application version, a compatible model of an application-installable device, and a version of compatible application-executable firmware, and wherein the second information comprises a second application name, a second application version and a version of a firmware contained in the image processing device.

11. The application management apparatus according to claim 1, further comprising a display configured to display information prompting a user to input a command to output the acquired application or the stored application to the image processing device, in response to the at least one processor determining that the application stored in the server is the first application or the second application.

12. The application management system according to claim 7, wherein the application management apparatus further includes a display configured to display information prompting a user to input a command to output the acquired application or the stored application to the image processing device, in response to the at least one processor determining that the application stored in the server is the first application or the second application.

13. The non-transitory computer readable medium according to claim 8, wherein the process further comprises displaying information prompting a user to input a command output to the acquired application or the stored application to the image processing device, in response determining that the application stored in the server is the first application or the second application.

14. The application management method according to claim 9, wherein the method further comprises displaying information prompting a user to input a command to output the acquired application or the stored application to the image processing device, in response determining that the application stored in the server is the first application or the second application.

* * * * *